United States Patent [19]

Hong

[11] Patent Number: 4,979,044
[45] Date of Patent: Dec. 18, 1990

[54] AUTOMATIC CONTRAST CIRCUIT FOR INSTANTANEOUS COMPENSATION

[75] Inventor: Sung-Pyo Hong, Suwon, Rep. of Korea

[73] Assignee: Samsung Electronics Co., Ltd., Suwon, Rep. of Korea

[21] Appl. No.: 310,784

[22] Filed: Feb. 13, 1989

[30] Foreign Application Priority Data

Apr. 2, 1988 [KR] Rep. of Korea ............... 88-3759

[51] Int. Cl.$^5$ ............................................. H04N 5/14
[52] U.S. Cl. .................................. 358/168; 358/169; 358/243
[58] Field of Search ................ 358/168, 169, 170, 243

[56] References Cited

U.S. PATENT DOCUMENTS

| | | | |
|---|---|---|---|
| 4,005,262 | 1/1977 | Fijisawa et al. | 358/169 |
| 4,091,419 | 5/1978 | Rhee et al. | 358/168 |
| 4,209,808 | 6/1980 | Harwood | 358/243 |
| 4,404,593 | 9/1983 | Shanley, II et al. | 358/168 |
| 4,587,554 | 5/1986 | Tamura et al. | 358/169 X |

Primary Examiner—John K. Peng
Assistant Examiner—Mark R. Powell
Attorney, Agent, or Firm—Ladas & Parry

[57] ABSTRACT

An automatic contrast control circuit for a television receiver detects the variations in video signal brightness to compensate the brightness and contrast by supplying as a contrast control signal a direct voltage output which is a composite of the brightness signal and a limited beam current from an automatic brightness limiter circuit (ABL), thus it is possible to obtain a reproduced image with a sharp contrast without the shake of the image.

2 Claims, 2 Drawing Sheets

AUTOMATIC CONTRAST CIRCUIT FOR INSTANTANEOUS COMPENSATION

BACKGROUND OF THE INVENTION

This invention relates to an automatic luminance control circuit for a television receiver to prevent the shake of a reproduced image which is caused by the variations in the brightness of the image to be reproduced.

In the television receivers, the larger cathode-ray tubes generally have more shaking phenomena of pictures due to the variations in beam current caused by the excessive brightness signal changes. In addition, the contrast control method which simply supplies a direct current output from a brightness limiter circuit utilizing a pre-set variable resistor, adversely affects the response characteristic between the brightness signal and the reproduced image on the cathode-ray tube.

SUMMARY OF THE INVENTION

It is an object of the present invention to provide an automatic luminance control circuit for controlling the beam current to be supplied to the cathode-ray tube upon detecting a brightness signal in the received television signal so as to prevent the shaking phenomena of the pictures as well as the adverse effect on the response characteristic between the brightness signal and the reproduced image on the cathode-ray tube.

Another object of the present invention is to provide an automatic luminance control circuit which can provide a stable signal compensation characteristic with respect to the temperature and other exterior conditions while improving the response characteristic between the brightness signal and the reproduced image.

The present invention is directed to supplying, as a contrast control signal, the composition signal of beam current and brightness signal through a differential amplifier of an inverting amplifier circuit.

The above objects may be effected by providing an automatic luminance control circuit comprising:
  a brightness signal amplifying means having a transistor for amplifying a brightness signal applied thereto from a luminance processing means through a bias resistor;
  an automatic brightness limiter circuit (ABL) included in a flyback transformer for supplying a beam current having a limited brightness; an inverting amplifier circuit connected to the output of said flyback transformer for producing a composed signal of said beam current and said brightness signal; and
  a direct voltage control means connected to the output side of said inverting amplifier circuit for supplying a divided voltage from a voltage source together with said composed signal as a contrast signal for a contrast controller.

BRIEF DESCRIPTION OF THE DRAWINGS

The above and other objects, features, and advantages of the invention will be more apparent from the detailed description taken in conjunction with the accompanying drawings, wherein.

DETAILED DESCRIPTION OF THE PREFERRED EMBODIMENT

Figure 1:
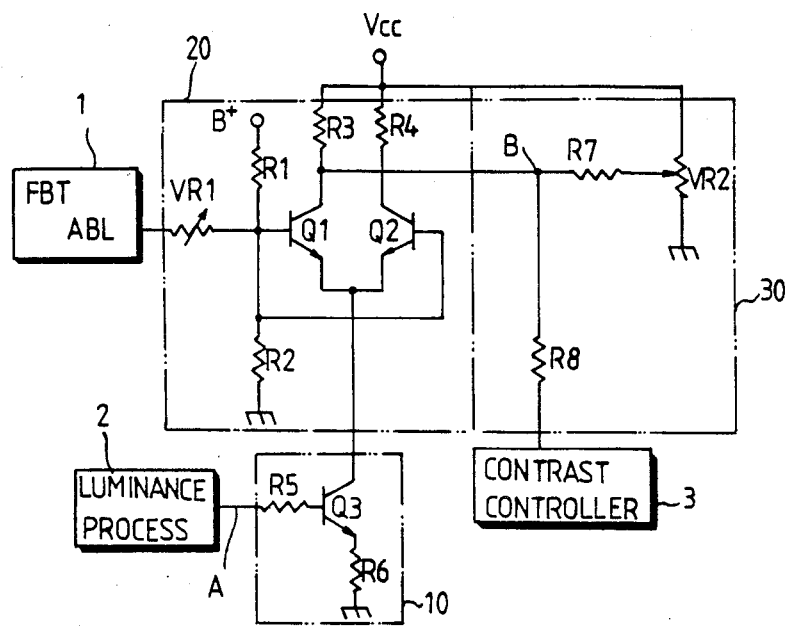
FIG. 1 is a schematic diagram of the automatic luminance control circuit of the present invention.

As shown in FIG. 1, the brightness signal amplifying circuit 10 is comprised of a transistor $Q_3$ and bias resistors $R_5$ and $R_6$ so as to receive an output of a luminance processor 2.

An automatic brightness limiter circuit (ABL) is included in a flyback transformer (FBT) 1. The ABL generally functions to limit the beam current in a cathode-ray tube by detecting the variations in current in the flyback transformer 1 and by feeding-back negatively to a video signal amplifier.

At the output side of FBT 1, an inverting amplifier circuit 20 includes transistor $Q_1$ and $Q_2$ for differential amplification connected in parallel with each other, a variable resistor VR1 connected between the output of the FBT 1 and the base of the transistor Q1, and bias sharing resistors R1 and R2 each connected to the base of the transistor Q1. The emitters of the transistors Q1 and Q2 are connected in common to the collector of the transistor Q3 in the brightness signal amplifying circuit 10.

Accordingly, the transistors Q1 and Q2 are adapted to compose the outputs from the FBT 1 and the luminance processor 2. The resistors R3 and R4 at the collector sides of the transistors Q1 and Q2 are connected in common to a direct voltage controller 30 which is comprised of a variable resistor VR2 to control the contrast, a resistor R7 connected at one terminal to the variable arm of the resistor VR2, and a resistor R8 connected between the other terminal of the resistor R7 and a contrast controller 3.

Reference symbols "Vcc" and "B+" represent the voltage sources connected to the transistors Q1 and Q2, respectively.

Then, operation of the automatic luminance control circuit of the present invention will be described with reference to the drawings.

Figure 2:
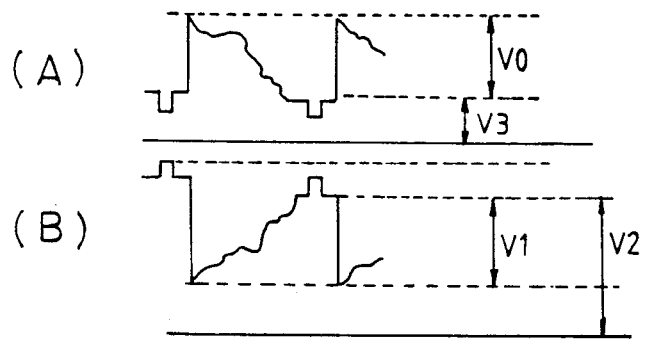
FIGS. 2A and 2B illustrate the video signal waveforms shown at points A and B of FIG. 1, respectively.

As shown in FIG. 2A, the brightness signal level V3 of a video signal has a DC gain whereas the contrast level V0 of the video signal has an AC gain. The brightness signal as picked up at point A and the limited beam current as generated from the FBT and picked up at point B are inversely proportional to each other.

In case that the brightness changes excessively with respective to a normal value, the present automatic luminance control circuit including the transistors Q1, Q2 and Q3 limits the brightness to be the normal value, while eliminating the shake of picture on the display due to the variation in brightness signal, otherwise presented in the prior automatic brightness limiter circuit.

The automatic luminance control circuit of the present invention detects the brightness signal in the television signal and automatically controls the beam current supplied to the cathode-ray tube so as to prevent the shaking phenomena of the reproduced image by combining the output of the automatic brightness limiter in the flyback transformer 1 and the brightness signal in the video signal to produce a direct voltage for controlling the contrast, whereby improving the response characteristic of the brightness signal and the reproduced image on the CRT display. Specifically, the brightness signal as shown in FIG. 2A which is generated from the luminance processor 2 is used as a means for controlling the inverting amplifier circuit 20 by varying the collector current of the transistor Q3 with the brightness level V3. The collector current increases for a bright signal and decreases for a dark signal.

Therefore, upon receiving a brightness signal through a bias resistor R5, the transistor Q3 of the brightness signal amplifying circuit 10 provides a path through which the transistors Q1 and Q2 allow their emitter current to flow. At the same time, the beam current from the FBT 1 is limited by the variable resistor VR1 and applied to the base electrodes of the transistors Q1 and Q2 together with a current from the voltage source B+ applied to the bias resistors R1 and R2 which turns on the transistors Q1 and Q2 allowing a current from the voltage source Vcc to flow through the resistors R3, R4 and R6 and the transistors Q1, Q2 and Q3 down to the ground potential. This current through the transistors Q1 and Q2 is controlled by the brightness level V3 through the transistor Q3 which in turn controls the inverting amplifier circuit 20 output having a magnitude compromised between the beam current from the FBT 1 and the brightness signal from the luminance processor 2.

Accordingly, at the collector side of the transistor Q1, there is provided an output signal as shown in FIG. 2B which is inverted with respective to the television signal of FIG. 2A.

According to the present invention, a differential amplifier is used as an inverting amplifier circuit taking advantage of the excellent temperature characteristic thanks to the high input impedance and low output drift voltage.

Then, the output of the inverting amplifier circuit 20 is applied to the contrast controller 3 together with a direct voltage which is divided from the voltage source Vcc through a variable resistor VR2 of the direct voltage controller 30 so that the resultant contrast is varied in proportion to the control voltage applied to the controller 3. Specifically, because said direct voltage is provided according to the present invention as a composed and inverted signal from the brightness signal and the beam current, the control voltage applied to the contrast controller 3 may be lowered against a bright input signal and raised against a dark input signal to the extent that the contrast control process does not affect a stable display of the cathode-ray tube. The output voltage for automatically controlling the brightness of a display is indicated in FIG. 2B as a voltage V2.

As described above, the luminance control circuit of the present invention can detect even the fine variations in video signal brightness to compensate the brightness and contrast instantaneously by supplying, as a contrast control signal, a direct voltage output which is a composite of the brightness signal and the beam current, thus it is possible to obtain a reproduced image with a sharp contrast.

In addition, the use of a differential amplifier in the inverting amplifier circuit 20 can secure a stable signal compensation characteristic against the exterior conditions including temperature, etc..

Therefore, the present invention eliminates the problem of unstable image reproduced in a television receiver having a large cathode-ray tube due to the variation in brightness and thus significantly improves the response characteristic between the brightness signal and the reproduced image.

The invention is in no way limited to the example described hereinabove. Various modifications of the disclosed embodiment, as well as other embodiments of the invention, will become apparent to persons skilled in the art upon reference of the description of the invention. It is therefore contemplated that the appended claims will cover any such modifications or embodiments as fall within the true scope of the invention.

What is claimed is:

1. An automatic contrast circuit for instantaneous compensation comprising:
    a luminance signal amplifying means having a device for amplifying a brightness signal applied thereto from a luminance processing means through a bias resistor;
    an automatic brightness limiter circuit included in a flyback transformer for supplying a beam current having a limited brightness;
    an inverting amplifier circuit connected between the luminance signal amplifying means and the brightness limiter circuit for producing a composite signal of said beam current and said brightness signal; and
    a direct voltage control means connected to the output side of the inverting amplifier circuit for supplying a divided voltage from a voltage source together with the composite signal as a control signal for a contrast controller.

2. An automatic contrast circuit for instantaneous compensation according to claim 1 wherein the inverting amplifier circuit includes a variable resistor and bias resistors connected to the automatic brightness limiter circuit, and transistors for differential amplification connected to the bias resistors to generate a DC voltage of the automatic brightness limiter circuit and a luminance signal.

* * * * *